(12) United States Patent
Wang

(10) Patent No.: US 10,319,182 B2
(45) Date of Patent: Jun. 11, 2019

(54) AUTOMATICALLY IDENTIFYING POTENTIALLY FRAUDULENT GAMING ACCOUNTS

(71) Applicant: Zynga Inc., San Francisco, CA (US)

(72) Inventor: Jia Wang, South San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 117 days.

(21) Appl. No.: 15/284,228

(22) Filed: Oct. 3, 2016

(65) Prior Publication Data

US 2017/0236370 A1 Aug. 17, 2017

Related U.S. Application Data

(60) Provisional application No. 62/295,394, filed on Feb. 15, 2016.

(51) Int. Cl.
*G07F 17/32* (2006.01)
*A63F 13/79* (2014.01)
(Continued)

(52) U.S. Cl.
CPC .......... *G07F 17/3241* (2013.01); *A63F 13/32* (2014.09); *A63F 13/327* (2014.09); *A63F 13/33* (2014.09); *A63F 13/332* (2014.09); *A63F 13/335* (2014.09); *A63F 13/75* (2014.09); *A63F 13/79* (2014.09); *A63F 13/92* (2014.09); *G07F 17/3218* (2013.01); *G07F 17/3225* (2013.01); *G07F 17/3248* (2013.01); *A63F 2300/405* (2013.01); *A63F 2300/406* (2013.01); *A63F 2300/407* (2013.01); *A63F 2300/5546* (2013.01); *A63F 2300/5586* (2013.01)

(58) Field of Classification Search
CPC .. G07F 17/3241; G07F 17/3225; A63F 13/75; A63F 13/79; A63F 2300/5586; A63F 2300/5546
USPC .......................................................... 463/25
See application file for complete search history.

(56) References Cited

U.S. PATENT DOCUMENTS 6,887,159 B2 * 5/2005 Leen ....................... G07F 17/32
463/29
8,376,855 B2 * 2/2013 Lockton .................. A63F 13/77
463/40

(Continued)

OTHER PUBLICATIONS

Quinlan, J. Ross, "C4.5: Programs for Machine Learning", Morgan Kaufmann Publishers, Inc., (1993), 314 pgs.

*Primary Examiner* — Michael A Cuff
(74) *Attorney, Agent, or Firm* — Schwegman Lundberg & Woessner, P.A.

(57) ABSTRACT

In example embodiments, a method of mitigating the effects of fraudulent usage of game accounts is disclosed. One or more values stored in one or more fields of a row of a database table maintained by the game networking system are received. The one or more fields correspond to features of a game account that are relevant to determining whether the game account is potentially being used fraudulently. Based on a combination of the one or more values transgressing a threshold value, it is determined that the game account is potentially being used fraudulently. At least some use of the potentially fraudulent game account is automatically locked to mitigate the effect of the potentially-fraudulent use.

15 Claims, 11 Drawing Sheets

(51) Int. Cl.
*A63F 13/75* (2014.01)
*A63F 13/32* (2014.01)
*A63F 13/33* (2014.01)
*A63F 13/335* (2014.01)
*A63F 13/332* (2014.01)
*A63F 13/92* (2014.01)
*A63F 13/327* (2014.01)

(56) References Cited

U.S. PATENT DOCUMENTS

| | | | | |
|---|---|---|---|---|
| 2003/0199313 A1* | 10/2003 | Gonen | G07F 17/32 | |
| | | | 463/25 | |
| 2004/0242321 A1* | 12/2004 | Overton | G06F 21/128 | |
| | | | 463/29 | |
| 2007/0135214 A1* | 6/2007 | Walker | G07F 17/32 | |
| | | | 463/29 | |
| 2008/0167118 A1* | 7/2008 | Kroeckel | G07F 17/32 | |
| | | | 463/1 | |
| 2009/0327122 A1* | 12/2009 | Isac | G06Q 10/00 | |
| | | | 705/39 | |
| 2010/0022289 A1* | 1/2010 | Menicou | A63F 13/12 | |
| | | | 463/14 | |

* cited by examiner

500

```
$ jython -J-Xmx4014n bots_poker_norm.jy train_data_uid_norm.arff test_data_uid_norm.arff
=============== STEP 1 ===============
Loading data...
Instance Size for Training Data: 764031 Rows!
Instance Size for Testing Data: 2353823 Rows!
=============== STEP 2 ===============
Build Machine Learning Model...
```

```
--> Evaluation

Corrctly Classifies Instances      2294409         97.4784 %
Incorrectly Classified Instances     59354          2.5216 %
Kappa statistic                                     0.9266
Mean absolute error                                 0.1
Root mean squared error                             0.1807
Relative absolute error                            17.1225 %
Root relative squared error                        30.2856 %
Coverage of cases (0.95 level)                     99.8682 %
Mean rel. region size (0.95 level)                  09.697 %
Total Number of Instances                         2353823

-->Detail Class

=== Detailed Accuracy By Class ===

TP Rate  FP Rate  Precision  Recall  F-Measure  MCC    ROC Area  PRC Area  Class
              0.979    0.041    0.983      0.979   0.984      0.927  0.996     0.999     normal
              0.959    0.021    0.927      0.959   0.943      0.927  0.996     0.990     bot
Weighted Avg. 0.975    0.037    0.975      0.975   0.975      0.927  0.996     0.997

=================================================================
--> Confusion Matrix

[1805558.0, 38296.0]    normal

[210058.0, 488911.0]    bot
```

FIG. 5

AUTOMATICALLY IDENTIFYING POTENTIALLY FRAUDULENT GAMING ACCOUNTS

CROSS-REFERENCE TO RELATED APPLICATIONS

This application claims the benefit of U.S. Provisional Application No. 62/295,394, filed Feb. 15, 2016, which is incorporated by reference herein in its entirety.

TECHNICAL FIELD

The present disclosure generally relates to computer-implemented games and, in one specific example, to enabling identification of potentially fraudulent gaming accounts to reduce potential revenue losses of an operator of a game networking system related to unauthorized exchanges involving virtual goods associated with the game networking system.

BACKGROUND

A game networking system may manage the creation and exchange of virtual goods pertaining to games executing on the game networking system. Such virtual goods may be deposited into gaming accounts of players when the players perform various actions, such as achieving particular objectives within a game, sharing information about a game with friends on social media, or inviting other people to play a game. Such actions may be game-play-related actions or non-game-play-related actions. For example, in Zynga poker, a player may win poker chips by winning a bet within a poker game or by winning a Lucky Bonus payout (e.g., by playing a separate Lucky Bonus slots game that is accessible by the player from within a Zynga poker client).

Additionally, players may acquire virtual goods by paying real money for the virtual goods. For example, a player of Zynga poker may purchase virtual poker chips using real money. Even if such virtual goods cannot be exchanged for real money, they may have a real money value-either because they were purchased by real money by a player or because of the time a player invested in performing the necessary actions to obtain the virtual goods.

Accordingly, an operator of the game networking system may wish to prevent unauthorized (e.g., black- or gray-market) exchanges of real money for virtual goods. For example, unauthorized exchanges may reduce revenues of the operator of the game networking system, reduce enjoyment of the players of the games executing on the game networking system, or disrupt business prediction models of the operator of the game networking system.

BRIEF DESCRIPTION OF THE DRAWINGS

Some embodiments are illustrated by way of example and not limitation in the figures of the accompanying drawings in which:

FIG. 5 is an example screen output from a machine-learning model application;

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In example embodiments, a method of mitigating the effects of fraudulent usage of game accounts is disclosed. One or more values stored in one or more fields of a row of a database table maintained by the game networking system are received. The one or more fields correspond to features of a game account that are relevant to determining whether the game account is potentially being used fraudulently. Based on a combination of the one or more values transgressing a threshold value, it is determined that the game account is potentially being used fraudulently. At least some use of the potentially fraudulent game account is automatically locked to mitigate the effect of the potentially-fraudulent use.

Figure 1:
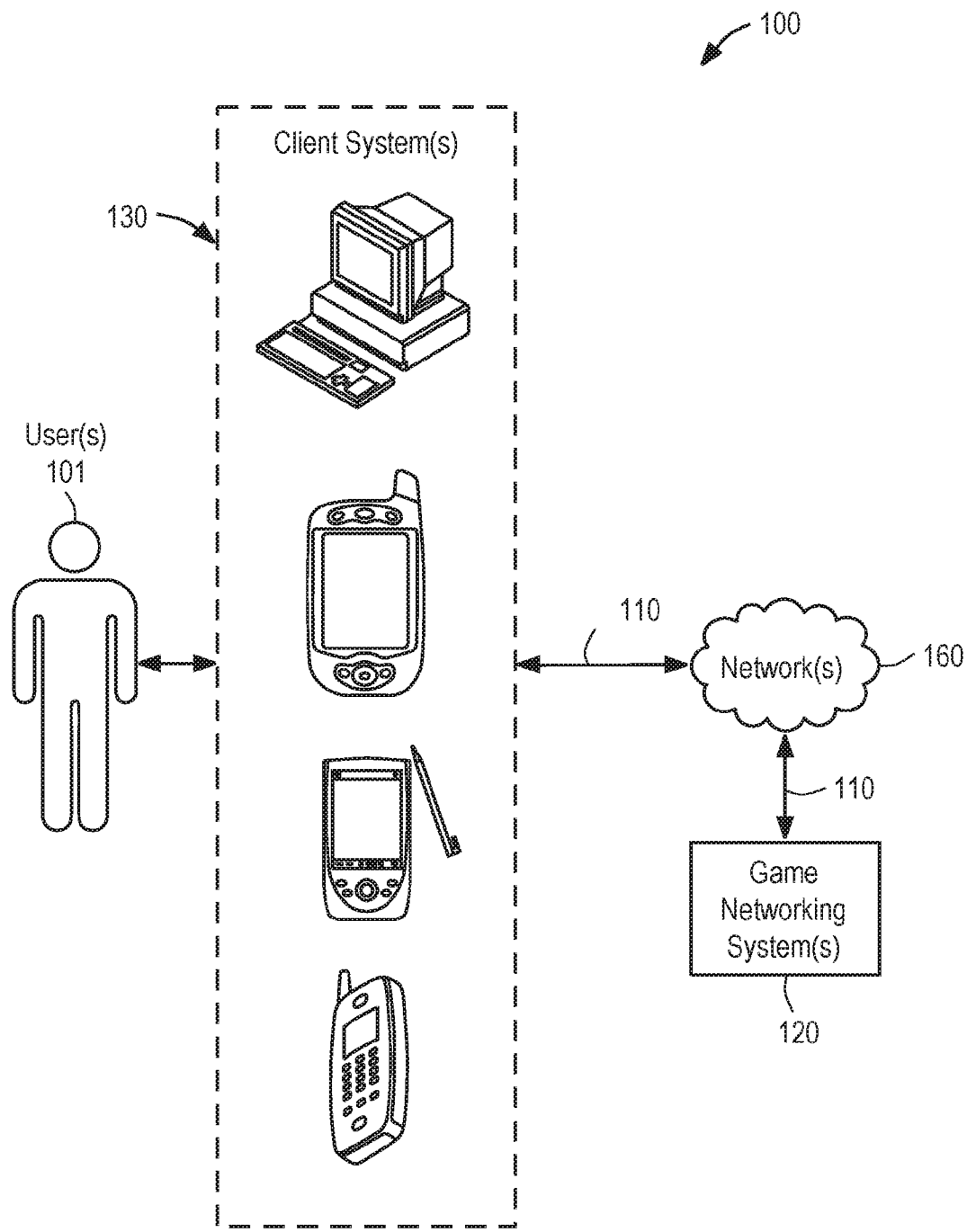
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises user(s) 101, game networking system(s) 120, client system(s) 130, and network(s) 160. The one or more users(s) 101 may also be referred to as one or more player(s); and the player(s) may also be referred to as the user(s) 101. The components of system 100 can be connected to each other in any suitable configuration, using any suitable type of connection. The components may be connected directly or over network(s) 160, which may be any suitable network. For example, one or more portions of network(s) 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Game networking system(s) 120 is a network-addressable computing system that can host one or more online games. Game networking system(s) 120 can generate, store, receive, and transmit game-related data, such as, for example, game account data, game input, game state data, and game displays. Game networking system(s) 120 can be accessed by the other components of system 100 either directly or via network(s) 160. Players (e.g., user(s) 101) may use client system(s) 130 to access, send data to, and receive data from game networking system(s) 120. Client system(s) 130 can access game networking system(s) 120 directly, via network 160, or via a third-party system. Client system(s) 130 can be any suitable computing device, such as a personal computer, laptop, cellular phone, smart phone, computing tablet, and the like.

Although FIG. 1 illustrates a particular number of user(s) 101, game networking system(s) 120, client system(s) 130, and network(s) 160, this disclosure contemplates any suitable number of users 101, game networking systems 120, client systems 130, and networks 160. Although FIG. 1 illustrates a particular arrangement of user(s) 101, game networking system(s) 120, client system(s) 130, and network(s) 160, this disclosure contemplates any suitable arrangement of user(s) 101, game networking system(s) 120, client system(s) 130, and network(s) 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between user(s) 101, game networking system(s) 120, client system(s) 130, and network(s) 160, this disclosure contemplates any suitable connections between user(s) 101, game networking system(s) 120, client system(s) 130, and network(s) 160. As an example and not by way of limitation, in particular embodiments, client system(s) 130 may have a direct connection to game networking system(s) 120, thereby bypassing network(s) 160.

Online Games and Game Systems
Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player (e.g., user 101) controls one or more player characters (PCs). The game engine controls all other aspects of the game, including NPCs and in-game objects. The game engine also manages game state, including player character state for currently active (e.g., online) and inactive (e.g., offline) players.

An online game can be hosted by game networking system(s) 120, which can be accessed using any suitable connection with a suitable client system(s) 130. A player may have a game account on game networking system(s) 120, wherein the game account can contain a variety of information associated with the player (e.g., the player's personal information, financial information, purchase history, player character state, game state, etc.). In some embodiments, a player may play multiple games on game networking system(s) 120, which may maintain a single game account for the player with respect to all the games, or multiple individual game accounts for each game with respect to the player. In some embodiments, game networking system(s) 120 can assign a unique identifier to each user 101 of an online game hosted on game networking system(s) 120. Game networking system(s) 120 can determine that a user 101 is accessing the online game by reading the user's 101 cookies, which may be appended to Hypertext Transfer Protocol (HTTP) requests transmitted by client system(s) 130, and/or by the user 101 logging onto the online game.

In particular embodiments, user(s) 101 may access an online game and control the game's progress via client system(s) 130 (e.g., by inputting commands to the game at the client device). Client system(s) 130 can display the game interface, receive inputs from user(s) 101, transmit user inputs or other events to the game engine, and receive instructions from the game engine. The game engine can be executed on any suitable system (such as, for example, client system(s) 130, or game networking system(s) 120). As an example and not by way of limitation, client system(s) 130 can download client components of an online game, which are executed locally, while a remote game server, such as game networking system(s) 120, provides backend support for the client components and may be responsible for maintaining application data of the game, processing the inputs from the player, updating and/or synchronizing the game state based on the game logic and each input from the player, and transmitting instructions to client system(s) 130. As another example and not by way of limitation, each time a player (e.g., a user 101) provides an input to the game through the client system(s) 130 (such as, for example, by typing on the keyboard or clicking the mouse of client system(s) 130), the client components of the game may transmit the player's input to game networking system(s) 120.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, user(s) 101 may access particular game instances of an online game. A game instance is a copy of a specific game play area that is created during runtime. In particular embodiments, a game instance is a discrete game play area where one or more user(s) 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more user(s) 101 and one or more in-game objects controlled by the game engine. When accessing an online game, the game engine may allow user(s) 101 to select a particular game instance to play from a plurality of game instances. Alternatively, the game engine may automatically select the game instance that user(s) 101 will access. In particular embodiments, an online game comprises only one game instance that all user(s) 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where a player and another user are directly connected (one edge), they are deemed to be separated by one degree of separation. The other user would be a so-called "first-degree friend" of the player. Where the player and the other user are connected through one other user (two edges), they are deemed to be separated by two degrees of separation. The other user would be a so-called "second-degree friend" of the player. Where the player and the other user are connected through N edges (or N−1 other users), they are deemed to be separated by N degrees of separation. The other user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, game networking system(s) 120). In one embodiment, Nmax equals 1, such that the player's social network includes only first-degree friends. In another embodiment, Nmax is unlimited and the player's social network is coextensive with the social graph.

In particular embodiments, the social graph is managed by game networking system(s) 120, which is managed by the game operator. In other embodiments, the social graph is part of a social networking system managed by a third-party (e.g., Facebook or Snapchat). In yet other embodiments, user 101 has a social network on both game networking system(s) 120 and a social networking system, wherein user(s) 101 can have a social network on the game networking system(s) 120 that is a subset, superset, or independent of the user's 101 social network on the social networking system. In such combined systems, game networking system(s) 120 can maintain social graph information with edge type attributes that indicate whether a given friend is an "in-game friend," an "out-of-game friend," or both. The various embodiments disclosed herein are operable when the social graph is managed by the social networking system, game networking system(s) 120, or both.

Figure 2:
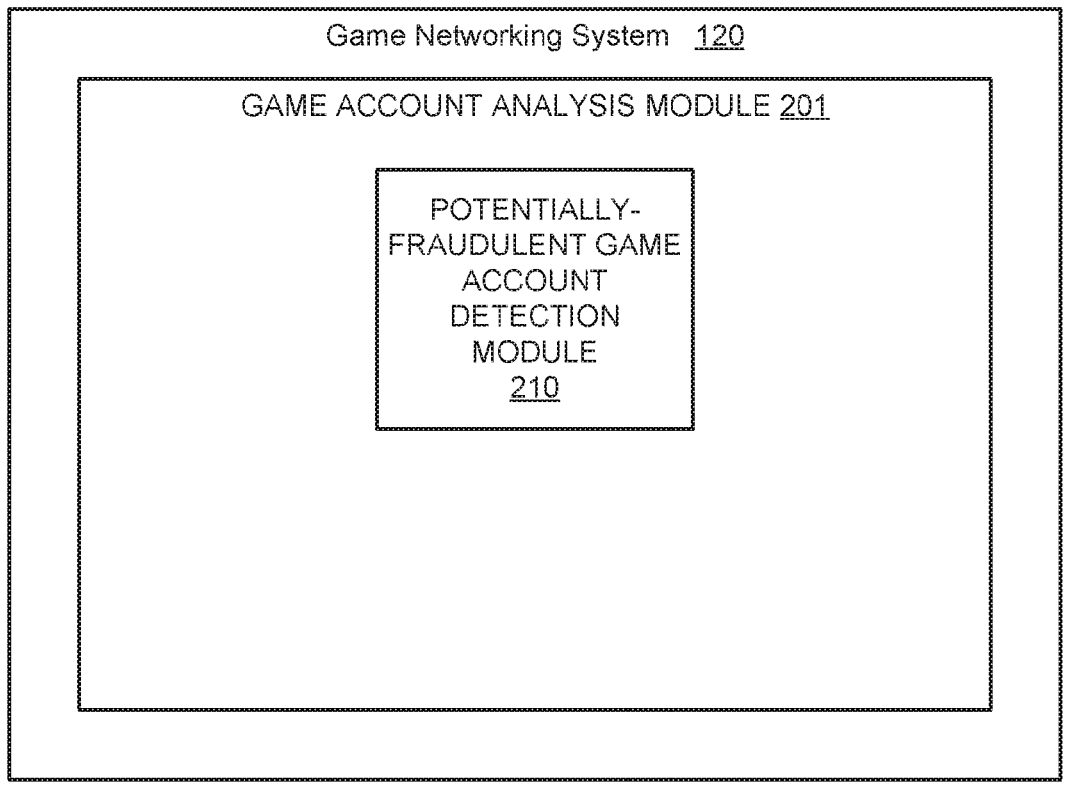
FIG. 2 is a block diagram illustrating an example modules of the game networking system of FIG. 1.

FIG. 2 is a block diagram illustrating an example game account analysis module 201 of the game networking system 120. The game account analysis module 201 is configured to analyze usage patterns of online game accounts. In example embodiments the game account analysis module 201 includes a potentially-fraudulent game account detection module 210. The potentially-fraudulent game account detection module 210 is configured to generate and apply a machine-learning model for detection of game accounts that are potentially being used fraudulently (e.g., to exchange virtual goods with other accounts based on a gray- or black-market), as described in more detail below.

Detection of Potentially-Fraudulent Game Accounts

Figure 3:
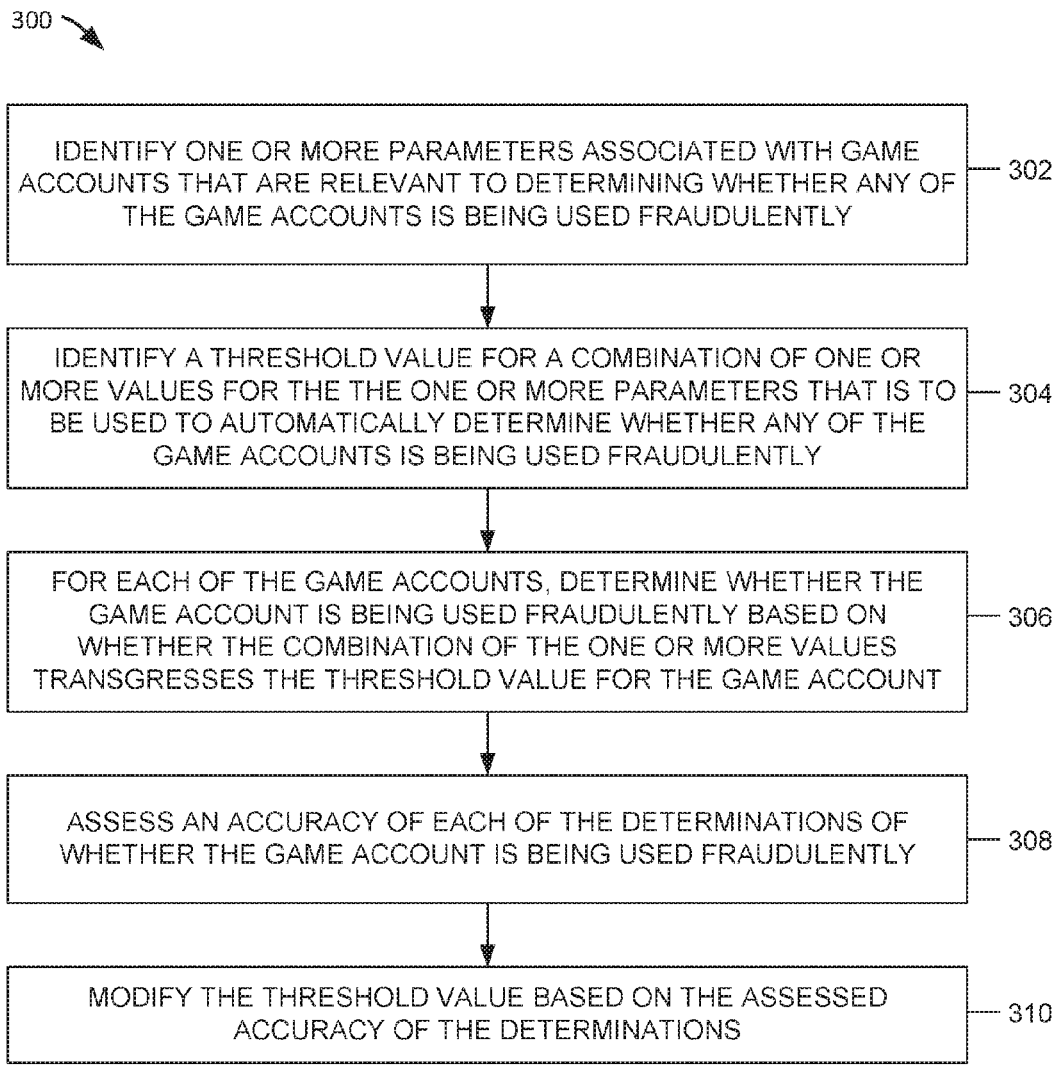
FIG. 3 is a block diagram of an example method of detecting potentially fraudulent use of game accounts.

FIG. 3. is a block diagram of an example method 300 of detecting potentially fraudulent use of game accounts. In various embodiments, the method 302 may be performed by the game account analysis module 201.

At operation 302, one or more parameters associated with a set of game accounts are identified, the one or more parameters relevant to determining whether any of the set of game accounts is being used fraudulently. In various embodiments, the one or more parameters may be identified based on an analysis of uses of other game accounts that were previously-linked to fraudulent activity versus game accounts that were previously-linked to non-fraudulent activity.

For example, it may be determined that other game accounts that were previously-linked to fraudulent activity were used to farm virtual goods in a particular abnormal way. For example, an account that is used for fraudulent activities may have been used often play a particular secondary game of a primary game, but used rarely to play the primary game, in contrast to usage patterns of accounts that are being used non-fraudulently. An example of such a secondary game is the Lucky Bonus mini-game that is periodically playable as a secondary game within Zynga Poker. It is a slots game that takes a bet in exchange for a chance to win a random number of chips. Thus, based on this behavior, a parameter relating to whether the game account is being used for fraudulent purposes would be ratio representing a number of primary-game-specific actions for which the account is used relative to non-primary-game specific actions for which the account is used.

As another example, it may be determined that other game accounts that were linked to fraudulent activity repeatedly lost a significant portion of their farmed virtual currency to a single other player in a very short period of time. Thus, additional parameters relating to whether the game account is being used for fraudulent purposes could include a speed at which the account loses its farmed virtual goods, a number of additional accounts to which the account loses its farmed currency, how often the account loses its farmed currency to additional accounts, how much of its farmed currency the account loses in a given period of time, and so on.

Figure 7:
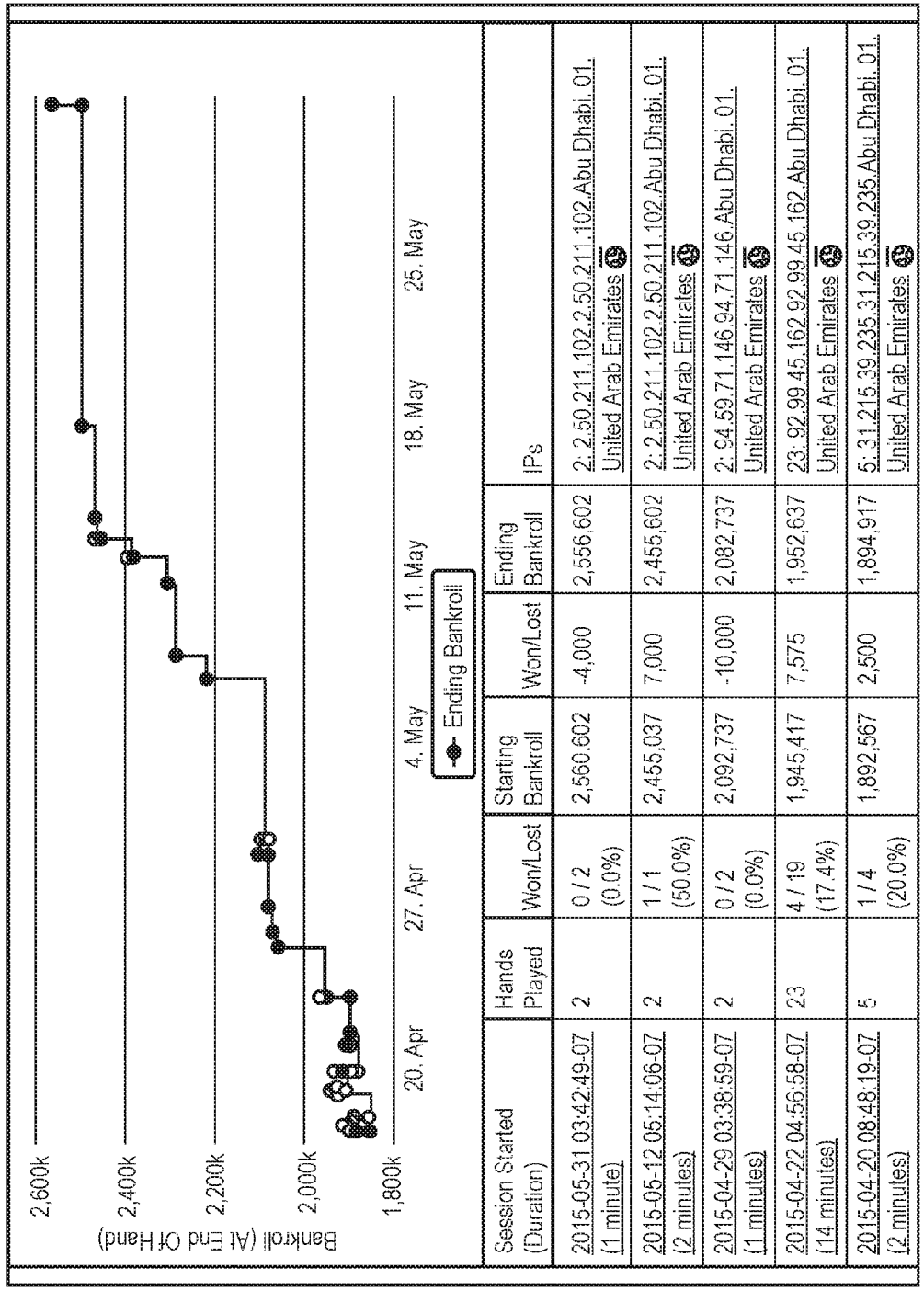
FIG. 7 is an example graph and game play data for a game account that was previously identified as normal, but has now been reclassified as being a "bot" (e.g., potentially associated with fraudulent activity) after application of the machine-learning model to the testing data.

Other parameters pertaining to identification of fraudulent accounts may relate to revenue earned by an operator of the game networking system from each of the accounts over a period of time relative to an average revenue from a larger set of game accounts over the period of time, a number of game-specific actions performed within a primary game (e.g., a number of hands played per day within Zynga poker) over a period of time, operating systems of clients accessing the game accounts, geographical location from which the game account is being accessed, a version of a client application from which the game account is being accessed, whether a payment method has been enabled for the game account. Some of the possible parameters, for example, are shown in FIG. 7.

Thus, the parameters related to identification of game accounts that are potentially being used fraudulently may be identified by comparing past patterns of usages accounts that were previously identified as having been used fraudulently in comparison to past patterns of usages of accounts that were previously identified as having been used non-fraudulently.

At operation 304, a threshold value for a combination of one or more values for the one or more identified parameters is identified. In example embodiments, each of the one or more values is a weighted value. Additionally, in example embodiments, the combination is a product or sum of the one or more weighted values. In various embodiments, the weightings for each of the one or more values and the threshold are configurable (e.g., by an administrator or automatically through a machine-learning process, as described in more detail below).

At operation 306, for each of the game accounts, it is determined whether the game account is being used fraudulently based on whether the combination of the one or more values for the game account transgresses the threshold value.

At operation 308, an accuracy of each of the determinations of fraudulent use is assessed. For example, in example embodiments, a sample set of determinations may be randomly selected from the full set of determinations and presented to an administrator for evaluation. Each of the selected sample determinations may be presented to the administrator in a user interface for flagging (e.g., as accurate, inaccurate, or questionable). Additionally or alternatively, in example embodiments, an automatic machine-learning mechanism may analyze various factors to assess the accuracy of one or more of the determinations. For example, usage patterns of the account after the flagging may be compared to usage of the account before the flagging to determine an impact of the flagging on the usage of the account. For example, the mechanism may determine that an owner of the account has submitted an online complaint pertaining to an observed impact by the owner of the account having been flagged as being used for fraudulent activity (e.g., as described in more detail below). Based on having received such a complaint, the mechanism may automatically determine that the flagging of the account was inaccurate. Additionally or alternatively, in example embodiments, if any restrictions placed on the account do not significantly impact usage of the account (e.g., based on falling within a normal distribution of normal usage patterns of other accounts that have been determined to be non-fraudulent), it may be determined that the flagging of the account as fraudulent activity inaccurate.

At operation 310, based on a determination of one or more inaccurate account assessments, the threshold value is automatically modified based on the assessment of the accuracy of the determinations of fraudulent use. Additionally or alternatively, one or more of the weightings of the one or more values is automatically modified. In various embodiments, a weighting is selected for modifications based on a comparison of the values of the parameters of the game account in comparison to the values of the same parameters for other game accounts that are known to be associated with fraudulent activity and/or other game accounts that are known to be associated with non-fraudulent activity. The weighting may then be tweaked to more accurately account for its relative importance in the combination of the one or more values that are used for determining whether the account is used fraudulently. In various embodiments, modifications to the threshold value are limited to a small configurable range such that the threshold value changes incrementally over time to include or exclude game accounts from the set of potentially-fraudulent accounts. In various embodiments, data identifying the usage patterns of the one or more game accounts is refreshed. The data is then reanalyzed using the latest weightings and threshold value. Game accounts may thus be continually scrutinized based on recent usage activity to reassess whether they are being used fraudulently.

Based on a determination that a set of game accounts is potentially being used for gaming activity, information from each of the set of gaming accounts may be used to further improve the accuracy of the flagging. For example, demographic data and other data, including country distribution, age, gender, email, names, and so on, may be used to further improve accuracy of future assessments (e.g., by increasing or decreasing the weightings of values associated with such data).

Figure 4:
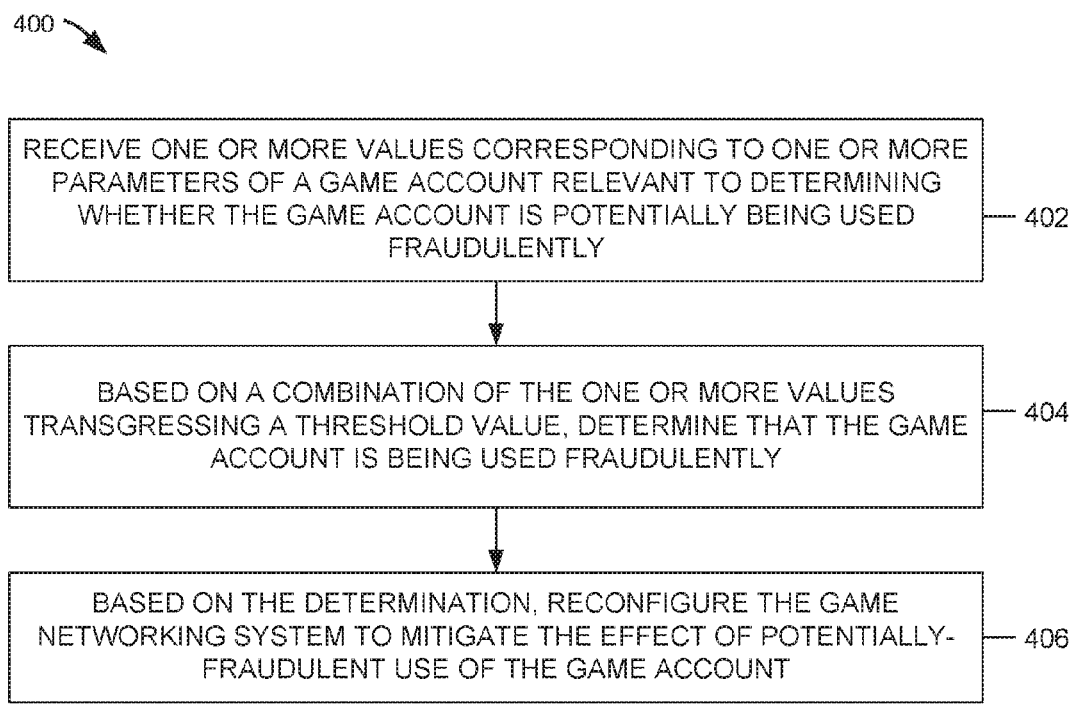
FIG. 4 is a block diagram of an example method of restricting game account usage based on a determination that the game account is being used fraudulently.

FIG. 4. is a block diagram of an example method 400 of restricting game account usage based on a determination that the game account is being used fraudulently. In various embodiments, the method 302 may be performed by the game account analysis module 201 or an analysis module executing on a client device separately from the game networking system.

At operation 402, one or more values corresponding to one or more parameters of a game account are received (e.g., from a service device at a client device). The one or more parameters are relevant to determining whether the game account is potentially being used for fraudulent activity. For example, the one or more parameters may relate to any of the features or factors discussed here, including those described with respect to FIG. 3. Such features or factors may include usage patterns of the game account, such as a measurement of usage of the game account to perform actions within a primary game (e.g., a number of hands played per day in Zynga poker), a measurement of the usage of the game account to farm bonuses separately from actions performed within the primary game (e.g., playing a secondary game, such as Zynga Poker's Lucky Bonus game, inviting friends to play the game, sharing information about the game on social media, and so on), a number of times that the account lost a significant portion (e.g., most, all, or an abnormally large amount) of its virtual assets, an amount of time that the player spent performing actions within the primary game, an amount of time that the player spent farming bonuses, and so on. The factors may also include, for example, a measurement of revenue collected by an operator of the game networking system from an owner of the game account (e.g., as a total sum or as a sum over a period of time, such as 60 days), a client application version, a method of payment, a country code, a screenname identifier, a client operating system, and so on. In various embodiments, the values of each of the one or more parameters are stored and maintained by the game networking server in a database table. In various embodiments, the database table includes, for each game account, fields for storing values corresponding to each of the one or more parameters. In various embodiments, the one or more parameters are automatically identified by the game networking system (e.g., as described above with respect to FIG. 3) and the database table is automatically updated by the game networking system to include the corresponding columns, fields, and values.

At operation 404, the one or more values of the one or more parameters are analyzed to determine whether the game account is being used for fraudulent activity, such as the selling or purchasing of virtual goods in a black or gray market. In example embodiments, one or more of the values corresponding to the one or more parameters are combined and compared to a threshold value. If the combination of the one or more values transgresses the threshold value, the game account may be flagged as potentially being associated with fraudulent activity. For example, an analysis of a game account pertaining to a poker game, such as Zynga poker, may include the following steps. A database table maintained by the game networking system and containing values pertaining to whether the game account may be queried by an analysis application. The query may request values for various game account parameters, including a number of hands played (e.g., for a particular time period, such as one day, one week, and so on), a total number of hands played, a number of bonus attempts made, and a number of times the account lost most or all of its poker chips to another player.

The analysis application may then combine the received values in various ways to determine whether the accounts is being used for fraudulent activity. For example, the analysis application may consider any one or more of the following factors: (1) hands played in a particular hand period/bonus attempts made to (2) total hands played/bonus attempts made. As another example, the analysis application may consider total hands played. As another example, the analysis application may consider bonus attempts made. As another example, the application may consider a ratio of (1) hands played in a particular time period/number of times the game account lost most or all of its virtual goods to another account in the time period to (2) total hands played/number of times the game account lost most or all of its virtual goods to another account in the time period. As another example, the analysis application may consider the number of times the game account lost most or all of its virtual goods to another account in the time period. Each of the factors may be considered individually against a threshold value (e.g., as determined by analysis of average accounts or a set of accounts that have no known association with fraudulent activity). In various embodiments, one or more of the factors may be weighted and combined and then compared to a corresponding combined threshold value.

At operation 406, the game networking system is reconfigured to mitigate the effect of the potentially-fraudulent use of the game account. For example, an owner of a fraudulent account may be notified of the unauthorized activity. In example embodiments, the user may be provided with a special offer to purchase virtual goods at a lower-than-normal price. In example embodiments, accounts associated with potentially fraudulent activity may be automatically restricted or banned from receiving full access to games or game features, including bonus offers (e.g., payouts from secondary games, such as Zynga Poker's Lucky bonus game, may be reduced).

FIG. 5 is an example screen output from a machine-learning model application. At step 1, the machine-learning model loads data, including training data and test data. In various embodiments, training data may include game account data corresponding to a set of game accounts that have been previously identified as being associated with fraudulent activity and a set of gaming accounts that have not been previously associated with fraudulent activity. The training data may also include game account data for a set of active players during a particular time period, such as a day, month, or year. In example embodiments, the testing data may include a set of active players during a particular time period for which it is to be determined, based on the training data, whether the game accounts are potentially associated with fraudulent activity. In example embodiments, the testing data may be separate by platform or operating system (e.g., Android, Web (e.g., Facebook), or iOS). Thus, the machine-learning model application may be applied to for game accounts associated with a client executing on a particular platform (e.g., Android) by loading the testing data corresponding only to those game accounts.

At step 2, the model is applied to the testing data and an evaluation of the current classification of each of the game accounts as being associated with fraudulent activity or not is provided. The evaluation includes a measure of the number of correctly classified game account instances and incorrectly classified game instances is provided. Additionally, statistical measurement of error are provided, along with detailed accuracy by class. A confusion matrix is also provided, indicating, for example, how many accounts that were previously associated with fraudulent activity (e.g., "bots") are normal accounts and how many accounts that were previously identified as normal accounts are potentially associated with fraudulent activity.

Figure 6:
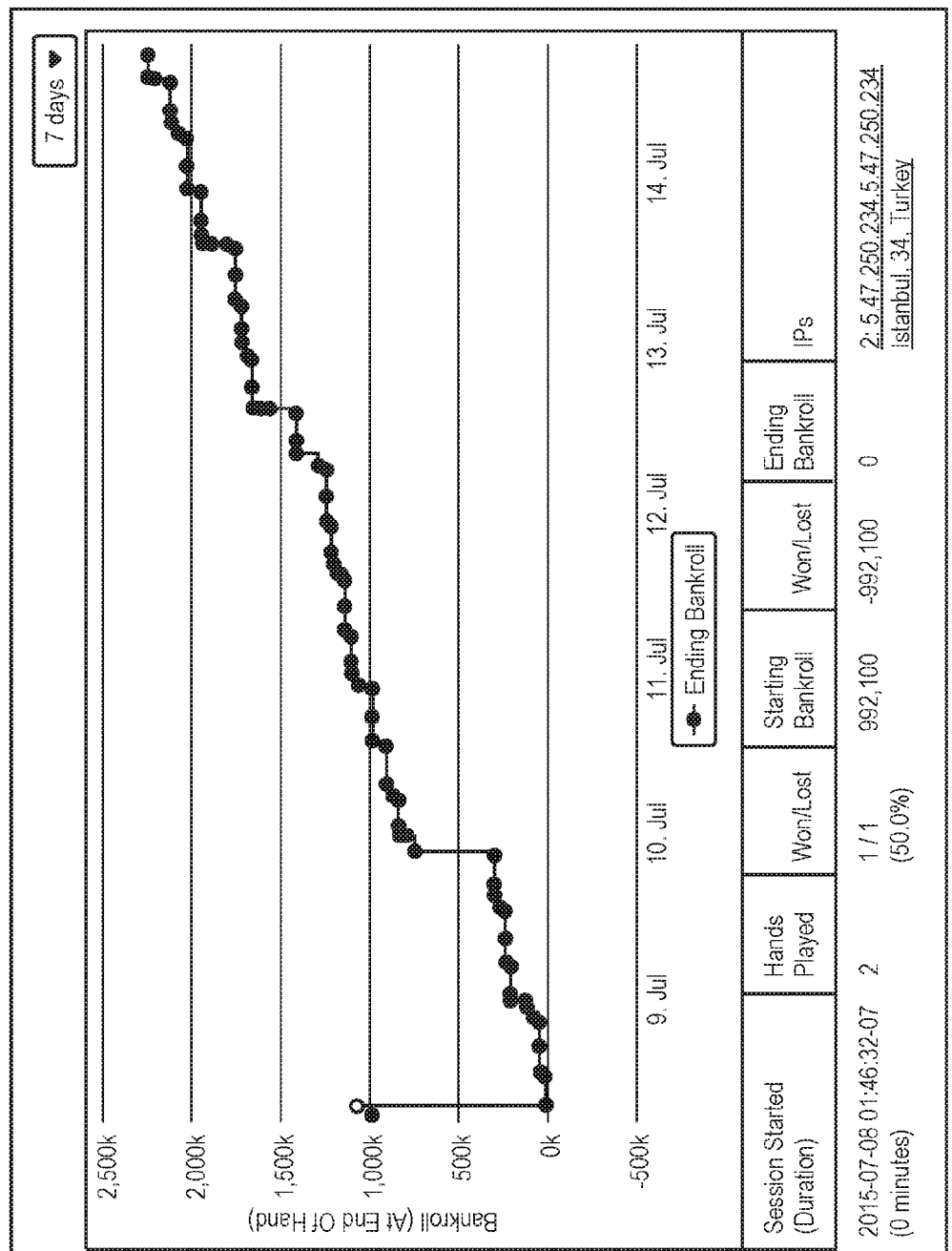
FIG. 6 is an example graph and game play data for a game account that has previously been associated with fraudulent activity.

FIG. 6 is an example graph and game play data for a game account that has previously been associated with fraudulent activity. Here, as an example, the game account is associated with a poker game, such as Zynga Poker. Although not depicted in the graph, the account has, over a period of weeks, repeated a pattern of accumulating virtual currency through bonus farming and quickly losing a significant amount of the currency to another game account in a short period of game play. The 7-day period depicted in the chart shows one instance of the pattern. The game account had accumulated 992,100 chips over approximately one week period prior to July 8. Then the game account lost all of the chips to another game account in just two hands of game play within the poker game. The game account then started accumulating more chips from July 8 to July 14. If the pattern continues, the game account will lose a significant of those chips to another game account in just a short amount of game play. The assumption is that the owner of the game account is selling chips to other players on the black or gray market.

FIG. 7 is an example graph and game play data for a game account that was previously identified as normal, but has now been reclassified as being a "bot" (e.g., associated with fraudulent activity) after application of the machine-learning model. Here, the size of the bankroll of the game account has varied significantly over a time period despite the game account being involved in very few in-game activities (e.g., hands played). Thus, the usage patterns of this game account resemble the patterns of game accounts that were previously identified as being associated with fraudulent activity, and this resemblance caused the machine-learning model to reclassify this game account as a "bot."

Figure 8:
FIG. 8 is an example user interface depicting various "user info" and "poker player stats" data that may be incorporated into the learning model for identifying accounts potentially associated with fraudulent activity.

FIG. 8 is an example user interface depicting various "user info" and "poker player stats" data that may be incorporated into the learning model for identifying accounts associated with fraudulent activity. The user info may include name of the user, a picture submitted by the user, a creation date of the game account, a number of chips in the account, an amount of a virtual good acquired by real money by an owner of the account (e.g., "gold"), a reputation score associated with the account, a credit (e.g., "seccam") score associated with the account, a game play (e.g., "poker") score associated with the account, whether the account is on a watchlist (e.g., for fraudulent activity or abuse), a number of friends or buddies linked to the account, whether the account has been associated with hacks recently, a number of confirmed hacks or phishes associated with the account, whether the account is banned (and notes associated with previous bans or ban decisions), a number of payments made from the account and the amount of money spent, a payment status for the account, an authentication scheme associated with the account, an antiphishing email address associated with the account, a number of abuse complaints associated with the account and initiated against the account, an identification of whether the account is currently classified as being associated with fraudulent activity (e.g., as a "bot") or has ever been classified as being associated with fraudulent activity, and whether the account is whitelisted for chip farming (e.g., whether any restrictions have been placed on the account to limit or prevent chip farming through bonuses or other offers).

The in-game statistics (e.g., "poker player stats") include a number of hands dealt, a bottomline number of chips won or lost, a number of hands won, a number of times a blind was called, a number of times a pre-flop raise was called, a number of times a flop was seen, a number of times a turn was seen, a number of times a river was seen, a number of times a showdown was seen, an amount of transfers into the account, an amount of transfers out of the account, a number of disconnects, a ratio of wins to disconnects, a number of times disconnect protection was used, a ratio of disconnect protections used to disconnect protections available, a number of standups, and a ratio of wins to standups.

Data Flow

FIG. 8 is a block diagram illustrating an example data flow between the components of system 2810. In particular embodiments, system 2810 can include client system 2830, social networking system 2820a, and game networking system 2820b. The components of system 2810 can be connected to each other in any suitable configuration, using any suitable type of connection. The components may be connected directly or over any suitable network. Client system 2830, social networking system 2820a, and game networking system 2820b can each have one or more corresponding data stores such as local data store 2825, social data store 2845, and game data store 2865, respectively. Social networking system 2820a and game networking system 2820b can also have one or more servers that can communicate with client system 2830 over an appropriate network. Social networking system 2820a and game networking system 2820b can have, for example, one or more internet servers for communicating with client system 2830 via the Internet. Similarly, social networking system 2820a and game networking system 2820b can have one or more mobile servers for communicating with client system 2830 via a mobile network (e.g., GSM, PCS, Wi-Fi, WPAN, etc.).

In some embodiments, one server may be able to communicate with client system 2830 over both the Internet and a mobile network. In other embodiments, separate servers can be used.

Client system 2830 can receive and transmit data 2823 to and from game networking system 2820b. This data can include, for example, webpages, messages, game inputs, game displays, HTTP packets, data requests, transaction information, updates, and other suitable data. At some other time, or at the same time, game networking system 2820b can communicate data 2843, 2847 (e.g., game state information, game system account information, page info, messages, data requests, updates, etc.) with other networking systems, such as social networking system 2820a (e.g., Facebook, Myspace, etc.). Client system 2830 can also receive and transmit data 2827 to and from social networking system 2820a. This data can include, for example, webpages, messages, social graph information, social network displays, HTTP packets, data requests, transaction information, updates, and other suitable data.

Communication between client system 2830, social networking system 2820a, and game networking system 2820b can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols may be used). In addition, a server in one interaction context may be a client in another interaction context. In particular embodiments, the information transmitted between hosts may be formatted as HTML documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820b, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820b. Game networking system 2820b may itself operate by retrieving a copy of the BLOB from a database or an intermediate memory cache (memcache) layer. Game networking system 2820b can also de-serialize the BLOB to resolve the game state parameters and execute its own game logic based on the events in the batch file of events transmitted by the client to synchronize the game state on the server side. Game networking system 2820b may then re-serialize the game state, now modified, into a BLOB and pass this to a memory cache layer for lazy updates to a persistent database.

With a client-server environment in which the online games may run, one server system, such as game networking system 2820b, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820b for further processing. In addition, multiple client systems 2830 may transmit other types of application data to game networking system 2820b.

In particular embodiments, a computer-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820a. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 2830, either caused by an action of a game player or by the game logic itself, client system 2830 may need to inform game networking system 2820b of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multiplayer online game hosted on a network-addressable system (such as, for example, social networking system 2820*a* or game networking system 2820*b*), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 2820*a* or game networking system 2820*b*). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 2830, the Flash client may send the events that caused the game state changes to the in-game object to game networking system 2820*b*. However, to expedite the processing and hence the speed of the overall gaming experience, the Flash client may collect a batch of some number of events or updates into a batch file. The number of events or updates may be determined by the Flash client dynamically or determined by game networking system 2820*b* based on server loads or other factors. For example, client system 2830 may send a batch file to game networking system 2820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820*b* may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 2820*b* may retrieve the corresponding BLOB from the database to determine the most-recent values of the game-related data. In particular embodiments, while a player is playing the online game, game networking system 2820*b* may also load the corresponding BLOB into a memory cache so that the game networking system 120 may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network-addressable resource or web site. Additionally, as used herein, a user may be an individual, a group, or an entity (such as a business or third-party application).

Figure 9:
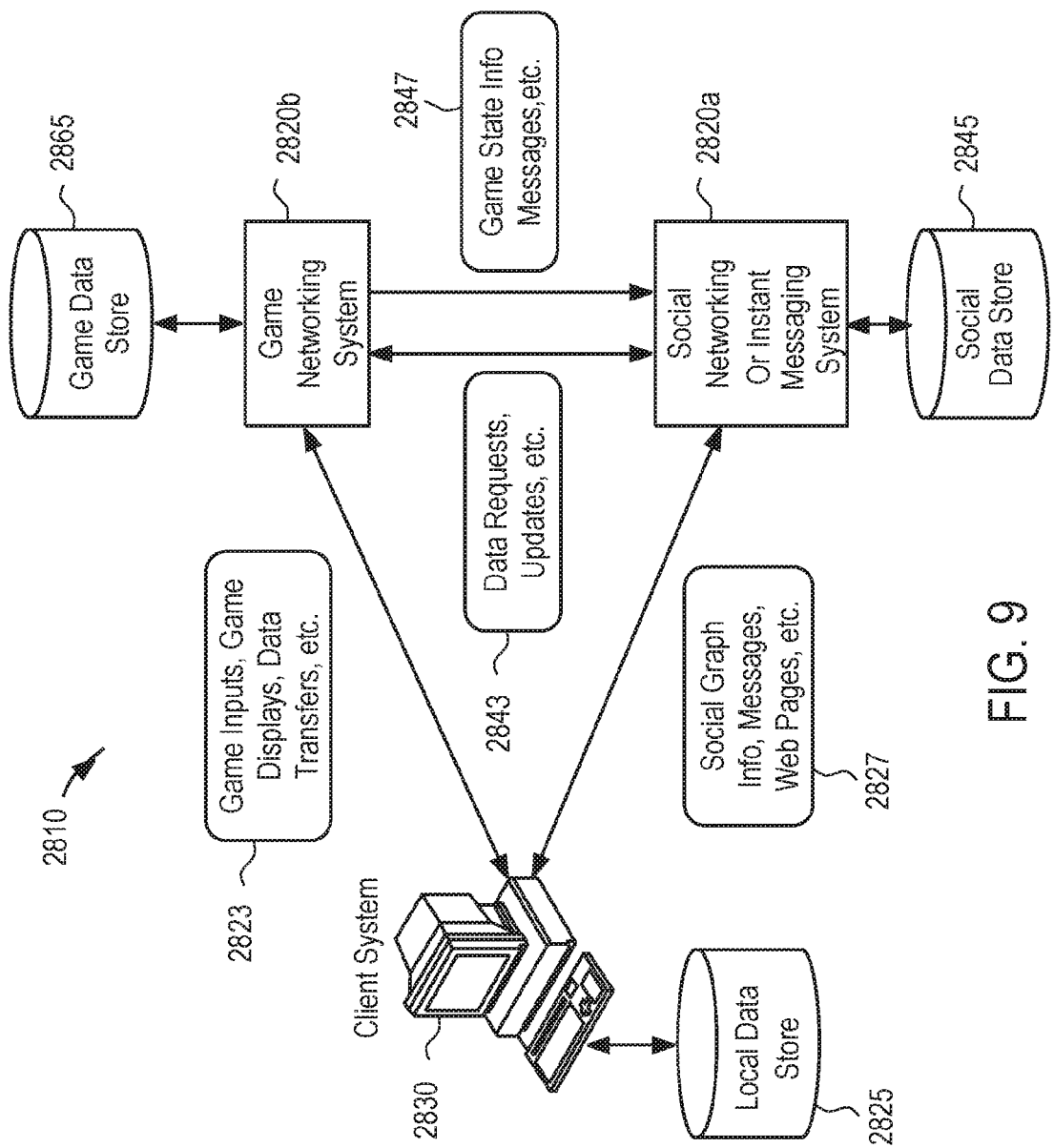
FIG. 9 is a block diagram illustrating an example data flow between the components of a system.

Particular embodiments may operate in a wide area network environment, such as the Internet, including multiple network-addressable systems. FIG. 9 is a block diagram illustrating an example network environment 2910, in which various example embodiments may operate. Network cloud 2960 generally represents one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 7 illustrates, particular embodiments may operate in a network environment comprising one or more networking systems, such as social networking system 2920*a*, game networking system 2920*b*, and one or more client systems 2930. The components of social networking system 2920*a* and game networking system 2920*b* operate analogously; as such, hereinafter they may be referred to simply as networking system 2920. Client systems 2930 are operably connected to the network environment 2910 via a network service provider, a wireless carrier, or any other suitable means.

Networking system 2920 is a network-addressable system that, in various example embodiments, comprises one or more physical servers 2922 and data stores 2924. The one or more physical servers 2922 are operably connected to computer network 2960 via, by way of example, a set of routers and/or networking switches 2926. In an example embodiment, the functionality hosted by the one or more physical servers 2922 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2924 corresponds to one or more of a variety of separate and integrated databases, such as relational databases and object-oriented databases, that maintain information as an integrated collection of logically related records or files stored on one or more physical systems. Structurally, data store 2924 may generally include one or more of a large class of data storage and management systems. In particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is a specially-configured a computer or computing device including functionality for communicating (e.g., remotely) over a computer network. Client system 2930 may be a desktop computer, laptop computer, personal digital assistant (PDA), in- or out-of-car navigation system, smart phone or other cellular or mobile phone, or mobile gaming device, among other suitable computing devices. Client system 2930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier (ID), as well as information identifying or characterizing the web browser or operating system running on the user's client system 2930. The request may also include location information identifying a geographic location of the user's client system or a logical network location of the user's client system. The request may also include a timestamp identifying when the request was transmitted.

Although the example network environment 2910 described above and illustrated in FIG. 9 is described with respect to social networking system 2920*a* and game networking system 2920*b*, this disclosure encompasses any suitable network environment using any suitable systems. As an example and not by way of limitation, the network environment may include online media systems, online reviewing systems, online search engines, online advertising systems, or any combination of two or more such systems.

Figure 10:
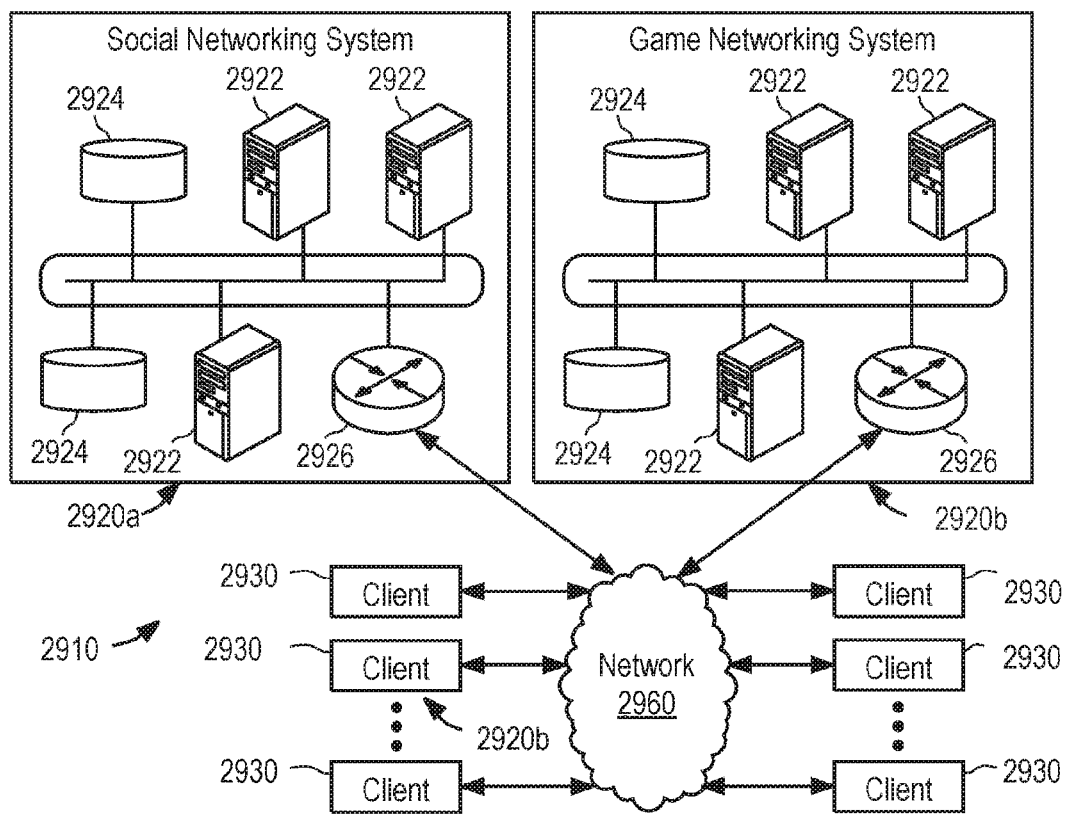
FIG. 10 is a block diagram illustrating an example network environment in which various example embodiments may operate.
Figure 11:
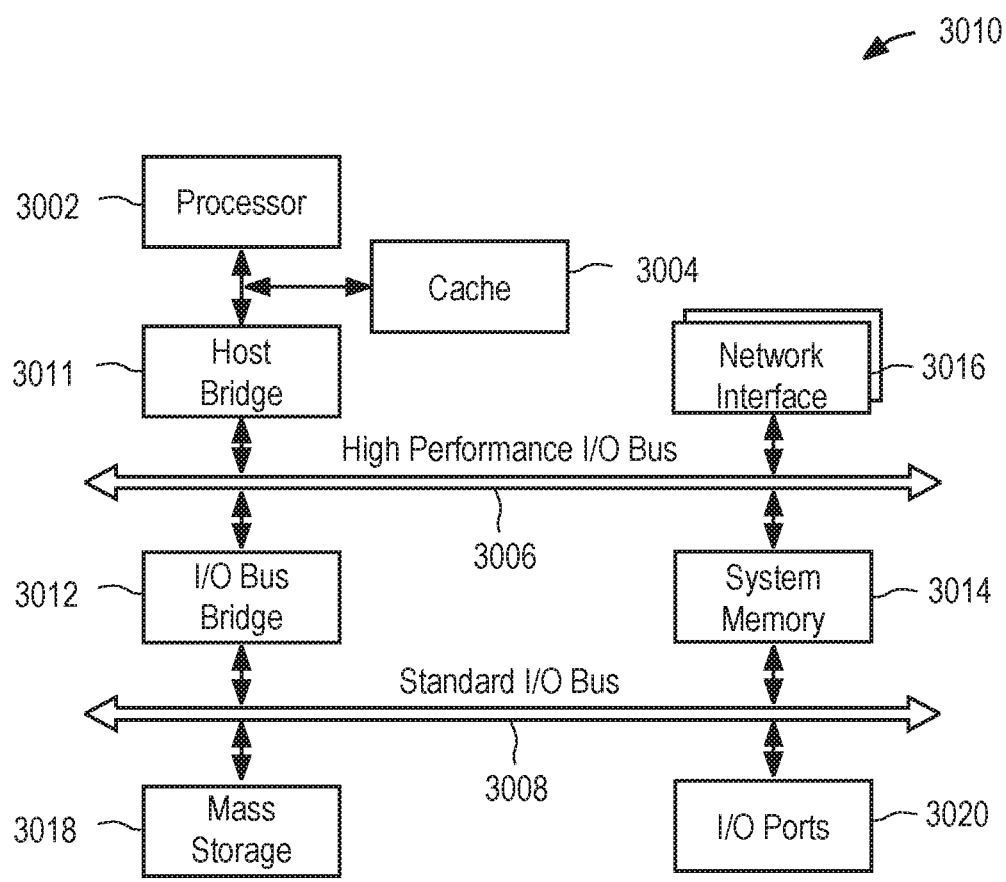
FIG. 11 is a block diagram illustrating an example computing system architecture that may be used to implement a server or a client system.

FIG. 10 is a block diagram illustrating an example computing system architecture, which may be used to implement a server 2922 or a client system 2930 (FIG. 9). In one embodiment, hardware system 3010 comprises a processor 3002, a cache memory 3004, and one or more executable modules and drivers, stored on a tangible computer-readable medium, directed to the functions or methodologies described herein. Additionally, hardware system 3010 may include a high performance input/output (I/O) bus 3006 and a standard I/O bus 3008. A host bridge 3011 may couple processor 3002 to high performance I/O bus 3006, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to specially-configured computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor. In example embodiments, one or more processors of one or more computer systems are specially configured (e.g., by programming logic stored in one or more memories of the one or more computer systems) such that the one or more computer systems are transformed from generic computing systems into specially-purposed computer systems capable of implementing or performing one or more of the embodiments disclosed herein.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 (e.g., DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures, and various components of hardware system 3010 may be rearranged. For example, cache memory 3004 may be on-chip with processor 3002. Alternatively, cache memory 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry.

Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a poker game, the embodiments can be applied to other games. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A system comprising:
one or more modules implemented by one or more processors of a game networking system, the one or more modules incorporated into the game networking system to specially configure the game networking system to, at least:
receive one or more values stored in one or more fields of a row of a database table maintained by the game networking system, the one or more fields corresponding to features of a game account that are relevant to determining whether the game account is a potentially fraudulent game account, wherein the features include at least one of a ratio of virtual goods received by the game account to a level of gaming activities performed by the game account and a ratio of a number of transfers of virtual goods out of the game account to an average number of transfers of virtual goods out of additional game accounts, and wherein at least some of the transfers of the virtual goods out of the game account are accomplished through deliberate losses by an owner of the game account;

based on a combination of the one or more values transgressing a threshold value, determine that the game account is the potentially fraudulent game account; and automatically prevent at least some use of the potentially fraudulent game account.

2. The system of claim 1, wherein the one or more modules further specially, configure the game networking system to, at least, identify the one or more features based on an analysis of activities of the game account in comparison to activities of additional game accounts, the additional game accounts identified as being non-fraudulent game accounts.

3. The system of claim 1, the one or more modules further specially configure the game networking system to, at least, identify the one or more features based on an analysis of activities of the game account in comparison to activities of additional game accounts, the additional game accounts identified as being fraudulent game accounts.

4. The system of claim 1, wherein the game account is used to play a gambling game, the virtual goods are virtual betting chips; and the level of gaming activities corresponds to a number of bets made with at least some of the virtual betting chips.

5. The system of claim 1, wherein the one or more modules further specially configure the game networking system to, at least:
 determine a new threshold value based on a receiving of an online submission of a complaint from an owner of the potentially fraudulent game account;
 based on a combination of the one or more values not transgressing the new threshold value, determine that the game account is not the potentially fraudulent game account; and
 automatically unlock the game account to allow use of the game account by the owner of the game account.

6. A method comprising:
 receiving one or more values stored in one or more fields of a row of a database table maintained by the game networking system, the one or more fields corresponding to features of a game account that are relevant to determining whether the game account is a potentially fraudulent game account, wherein the features include at least one of a ratio of virtual goods received by the game account to a level of gaming activities performed by the game account and a ratio of a number of transfers of virtual goods out of the game account to an average number of transfers of virtual goods out of additional game accounts, and wherein at least some of the transfers of the virtual goods out of the game account are accomplished through deliberate losses by an owner of the game account;
 based on a combination of the one or more values transgressing a threshold value, determining that the game account is the potentially fraudulent game account; and
 automatically preventing at least some use of the potentially game account.

7. The method of claim 6, further comprising identifying the one or more features based on an analysis of activities of the game account in comparison to activities of additional game accounts, the additional game accounts identified as being non-fraudulent game accounts.

8. The method of claim 6, further comprising identifying the one or more features based on an analysis of activities of the game account in comparison to activities of additional game accounts, the additional game accounts identified as being fraudulent game accounts.

9. The method of claim 6, wherein the game account is used to play a gambling game, the virtual goods are virtual betting chips, and the level of gaming activities corresponds to a number of bets made with at least some of the virtual betting chips.

10. The method of claim 6, further comprising:
 determining a new threshold value based on a receiving of an online submission of a complaint from an owner of the potentially fraudulent game account;
 based on a combination of the one or more values not transgressing the new threshold value, determining that the game account is not the potentially fraudulent game account; and
 automatically unlocking the game account to allow use of the game account by the owner of the game account.

11. A non-transitory machine-readable storage medium storing a set of instructions that, when executed by at least one processor, causes the at least one processor to perform operations, the operations comprising:
 receiving one or more values stored in one or more fields of a row of a database table maintained by the game networking system, the one or more fields corresponding to features of a game account that are relevant to determining whether the game account is a potentially fraudulent game account, wherein the features include at least one of a ratio of virtual goods received by the game account to a level of gaming activities performed by the game account and a ratio of a number of transfers of virtual goods out of the game account to an average number of transfers of virtual goods out of additional game accounts, and wherein at least some of the transfers of the virtual goods out of the game account are accomplished through deliberate losses by an owner of the game account;
 based on a combination of the one or more values transgressing a threshold value, determining that the game account is the potentially fraudulent game account; and
 automatically preventing at least some use of the potentially fraudulent game account.

12. The non-transitory machine-readable storage medium of claim 11, the operations further comprising identifying the one or more features based on an analysis of activities of the game account in comparison to activities of additional game accounts, the additional game accounts identified as being non-fraudulent game accounts.

13. The non-transitory machine-readable storage medium of claim 11, the operations further comprising identifying the one or more features based on an analysis of activities of the game account in comparison to activities of additional game accounts, the additional game accounts identified as being fraudulent game accounts.

14. The non-transitory machine-readable storage medium of claim 11, wherein the game account is used to play a gambling game, the virtual goods are virtual betting chips, and the level of gaming activities corresponds to a number of bets made with at least some of the virtual betting chips.

15. The non-transitory machine-readable storage medium of claim 11, the operations further comprising:
 determining a new threshold value based on a receiving of an online submission of a complaint from an owner of the potentially fraudulent game account;

based on a combination of the one or more values not transgressing the new threshold value, determining that the game account is not the potentially fraudulent game account; and automatically unlocking the game account to allow use of the game account by the owner of the game account.

* * * * *